UNITED STATES PATENT OFFICE.

HENRY W. HOLLY AND SIDNEY L. GEER, OF NORWICH, CONNECTICUT.

IMPROVEMENT IN THE MANUFACTURE OF ARTIFICIAL SLATES.

Specification forming part of Letters Patent No. 61,196, dated January 15, 1867.

*To all whom it may concern:*

Be it known that we, HENRY W. HOLLY and SIDNEY L. GEER, both of Norwich, in the county of New London and State of Connecticut, have invented or discovered a new and useful Compound Forming Liquid Slating, applicable to artificial slates, tablets, blackboards, and other purposes; and we do hereby declare the following to be a full, clear, and exact description thereof.

Liquid slating for coating paper, pasteboard, sheet metal, and wood or other suitable substance, to produce a surface resembling natural or dressed slate, has previously been composed of various ingredients dissolved in or admixed with a suitable menstruum and reduced to a consistency so as to be applied after the manner of paint, with a brush. Alcohol, gum-arabic, or glue, also shellac, have, one or other or all of them, admixed with slate-dust or other grit, been commonly used, alcohol as the necessary menstruum and gum or its equivalent to produce the adhesive character. But these articles, and frequently other ingredients, as well admixed in such compositions or compounds, have usually, and more particularly of late, been so costly as to make very expensive the article of commerce now known as liquid slating. All such costly ingredients we dispense with in this our invention, and produce an article inferior to few, if any, and superior to many liquid slatings in use, at a largely reduced expense. For this purpose we employ, as a menstruum, liquid quartz or silex, and are enabled to dispense with both alcohol and gum or shellac; but, for the information of those whom it may concern, we will now proceed to more fully describe our present invention.

To produce a dark-colored or black slating we take, for instance, equal parts or thereabouts, by measure, of lamp-black and grit, which latter may be emery, pumice-stone, slate-dust, rotten-stone, or other suitable hard pulverized substance, or any or all of these separate or combined in equal or unequal proportions. Such composition of lamp-black and grit we then mix with a sufficient quantity of liquid silex, say of ordinary commercial density, to bring the whole to a consistency that will admit of it being worked with a brush as a coating on paper, pasteboard, sheet metal, wood, or other suitable substance, according to the purpose the same is designed to be applied to, whether to produce artificial slates, tablets, blackboards, or other articles.

In cases where it is desired to make the slating of a comparatively light color, or other than black, any suitable coloring matter instead of lamp-black, or lighter coloring matter combined with a reduced proportion of lamp-black, may be used.

We claim as our invention—

1. The use of liquid silex as a menstruum or binding material in liquid slating.

2. Liquid slating composed of the ingredients specified, in or about the proportions set forth.

HENRY W. HOLLY.
S. L. GEER.

Witnesses:
A. LE CLERC,
J. W. COOMBS.